(12) United States Patent
Bian et al.

(10) Patent No.: US 6,677,052 B2
(45) Date of Patent: Jan. 13, 2004

(54) PRESEED LAYER FOR A MAGNETIC RECORDING DISK

(75) Inventors: Xiaoping Bian, San Jose, CA (US); Mary Frances Doerner, Santa Cruz, CA (US); Kai Tang, San Jose, CA (US); Qi-Fan Xiao, San Jose, CA (US)

(73) Assignees: Hitachi Global Storage Technologies, Amsterdam; Netherlands B.V., The Netherlands ( * ) Notice: Subject to any disclaimer, the term of this patent is extended or adjusted under 35 U.S.C. 154(b) by 13 days.

(21) Appl. No.: 10/158,377

(22) Filed: May 29, 2002

(65) Prior Publication Data

US 2003/0224211 A1 Dec. 4, 2003

(51) Int. Cl.[7] ................................................ G11B 5/66
(52) U.S. Cl. ........................ 428/611; 428/660; 428/666; 428/900; 428/928; 428/694 TS; 360/135
(58) Field of Search .......................... 360/135; 428/611, 428/900, 928, 666, 660, 694 TS

(56) References Cited

U.S. PATENT DOCUMENTS

| | | | |
|---|---|---|---|
| 5,789,056 A | 8/1998 | Bian et al. | 428/65.3 |
| 5,879,783 A * | 3/1999 | Chang et al. | 428/141 |
| 5,993,956 A * | 11/1999 | Lambeth et al. | 428/332 |
| 6,001,447 A * | 12/1999 | Tanahashi et al. | 428/65.3 |
| 6,010,795 A * | 1/2000 | Chen et al. | 428/611 |
| 6,143,388 A * | 11/2000 | Bian et al. | 428/65.3 |
| 6,146,754 A | 11/2000 | Song et al. | 428/332 |
| 6,187,408 B1 | 2/2001 | Bian et al. | 428/65.3 |
| 6,197,367 B1 | 3/2001 | Matsuda et al. | 427/127 |
| 6,221,508 B1 * | 4/2001 | Kanbe et al. | 428/617 |
| 6,268,036 B1 | 7/2001 | Marinero et al. | 428/65.3 |
| 6,303,217 B1 | 10/2001 | Malhotra et al. | 428/332 |
| 6,316,097 B1 | 11/2001 | Liu et al. | 428/332 |
| 6,593,009 B2 * | 7/2003 | Bian et al. | 428/611 |
| 2003/0008177 A1 * | 1/2003 | Bian et al. | 428/694 TS |
| 2003/0008178 A1 * | 1/2003 | Bian et al. | 428/694 TS |
| 2003/0090831 A1 * | 5/2003 | Doerner et al. | 360/97.01 |

FOREIGN PATENT DOCUMENTS

| | | | |
|---|---|---|---|
| JP | 63-187416 | * | 8/1988 |
| JP | 04-153910 | * | 5/1992 |
| JP | 2000-020936 | * | 1/2000 |

OTHER PUBLICATIONS

Mirzamaani et al., "Recording Performance of Thin Film Media With Various Crystallographic Preferred Orientations on Glass Substrates", IEEE Transactions on Magnetics, vol. 34, No. 4, pp1588–1560, Jul. 1998.*

Kanbe et al., "Effects of Underlayer Grain Size on the Microstructure of the Magnetic Layer in CoCrPt Media", IEEE Transactions on Magnetics, vol. 35, No. 5, pp 2667–2669, Sep. 1999.*

Hong et al., "A Double Underlayer for Co–Based Longitudinal Recording Thin Film Media", IEEE Transactions on Magnetics, V 35, No. 5, pp 2628–2633, Sep. 1999.*

Nolan et al., "Independent Optimization of Nucleation and Growth Processes of Titanium–Alloy Underlayers for Cobalt–Alloy Perpendicular Recording Media", Mat. Res. Soc. Symp. Proc. vol. 403, pp 713–718, 1996 (no month).*

* cited by examiner

*Primary Examiner*—John J. Zimmerman
(74) *Attorney, Agent, or Firm*—Lewis L. Nunnelley

(57) ABSTRACT

A magnetic recording disk is provided having an amorphous preseed layer of chromium, titanium, and yttrium. The use of the preseed layer improves the magnetic performance of the disk including signal to noise, inplane orientation, and readback pulsewidth.

12 Claims, 3 Drawing Sheets

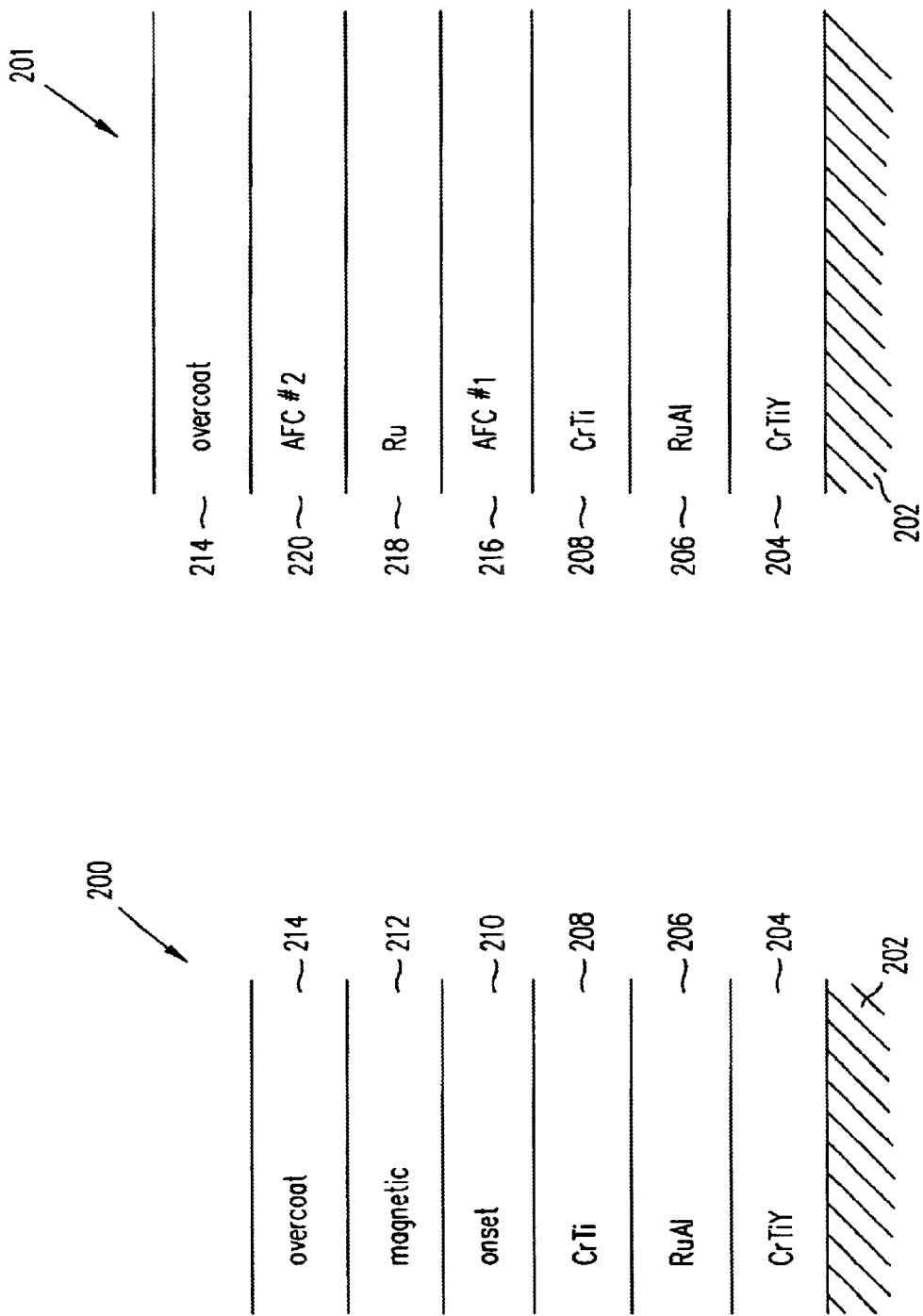

| Disk Sample | Preseed composition Cr/Ti/Y Atomic % | Hcr (Oe) | S/N dB (at 300 KBPI) | PW50 (nm) | FWHM RuAl (200) (degrees) | FWHM Co (1120) (degrees) |
|---|---|---|---|---|---|---|
| 1 | 50/50/0 | 3920 | 29.5 | 123.9 | 13.2 | 10.9 |
| 2 | 47.5/47.5/5 | 3790 | 29.9 | 122.5 | 10.5 | 8.8 |
| 3 | 46.5/46.5/7 | 3850 | 29.7 | 122.6 | 10.2 | 8.6 |
| 4 | 45/45/10 | 3800 | 29.6 | 123.1 | 11.1 | 9.3 |

PRESEED LAYER FOR A MAGNETIC RECORDING DISK

RELATED APPLICATION

A pending, commonly assigned U.S. patent application bearing the Ser. No. 09/798,235, now U.S. Pat. No. 6,593,009, describes the use of CrTi as a preseed layer for a magnetic disk and is incorporated herein by reference.

BACKGROUND OF THE INVENTION

1. Field of the Invention

The invention relates to the field of disk drives used as storage devices in computers. More specifically, the invention relates to a preseed layer for a magnetic disk used in a disk drive.

2. Description of the Background Art

Disk drives using magnetic recording of digital information are used to store most of the information in contemporary computer systems. A disk drive typically has a housing with at least one rotatable magnetic disk having a plurality of concentric tracks of magnetically stored data. There is at least one recording head typically with a separate write element and read element for writing and reading data on the tracks. The recording head is constructed on a slider and the slider is attached to a suspension. The suspension is connected to an actuator which positions the recording head over a specific track of interest. The actuator first rotates to seek the track of interest and after positioning the recording head over that track maintains the recording head in close registration to that track.

The slider carrying the recording head has a disk facing surface upon which an air bearing is constructed. The purpose of the air bearing is to allow the slider to float on a cushion of air over the rotating disk and to be positioned close to the disk surface. Alternatively, the disk facing surface of the slider may be designed to be in contact with the disk.

The magnetic recording disk in a disk drive typically has a substrate, an underlayer usually of chromium or a chromium alloy, a magnetic layer usually of a cobalt alloy, and an overcoat of carbon. The substrate is typically formed of glass or aluminum alloy. The microstructural aspects of the magnetic layer such as crystallographic orientation, grain size, and the degree of magnetic exchange coupling play key roles in the recording performance of the disk and are strongly influenced by aspects of the underlayer. One example of demonstrating the role that the underlayer plays is given in U.S. Pat. No. 5,789,056, Bian, et al., which is incorporated by reference herein.

Each new disk drive product usually has a higher areal recorded density of information than previous products. As the recorded bit on the disk becomes smaller and smaller, there is a greater demand placed on the necessary disk magnetic performance to achieve those high densities. Typically, the disk in each new disk drive product is required to have a higher signal to noise ratio and the ability to record sharper magnetic transitions. While previous disks have had adequate performance for the lower required densities of previous disk drives, the performance of disks needs to be improved for the very high density requirements demanded for new disk drives. Even a small improvement in signal to noise ratio may have a significant impact on the recording performance of the disk.

From the foregoing, it is apparent that a disk with improved recording characteristics is needed. In particular, disks with improved underlayers which result in better magnetic recording performance are needed.

SUMMARY OF THE INVENTION

The present invention provides for a disk for magnetic recording having a preseed layer comprising chromium, titanium, and yttrium. This particular preseed layer unexpectedly provides for a more sharply defined preferred orientation in the magnetic layer. Using this preseed layer results in a disk with better signal to noise ratio and narrower readback pulses. In addition, the present invention provides for a disk drive wherein the disk includes a preseed layer comprising chromium, titanium, and yttrium.

Additional advantages of the present invention will become apparent to those skilled in this art from the following detailed description along with the accompanying illustrations wherein only the preferred embodiment of the invention is shown. The invention is capable of other embodiments, and its details are capable of modifications in various obvious respects without parting from the scope of the invention.

BRIEF DESCRIPTION OF THE DRAWINGS

FIG. 2a illustrates a cross sectional view of the layers in a disk provided by the invention;

FIG. 2b illustrates a cross sectional view of the layers in an alternate disk provided by the invention; and, FIG. 3 shows a table of experimental disk compositions and test results.

DETAILED DESCRIPTION OF THE INVENTION

The present invention provides for a magnetic recording disk which includes an amorphous preseed layer having a composition including chromium (Cr), titanium (Ti), and yttrium (Y). The disk also includes a seed layer, and a magnetic layer. A magnetic recording disk provided by the present invention provides superior magnetic recording aperformance compared with disks which do not have the amorphous preseed layer.

Figure 1A:
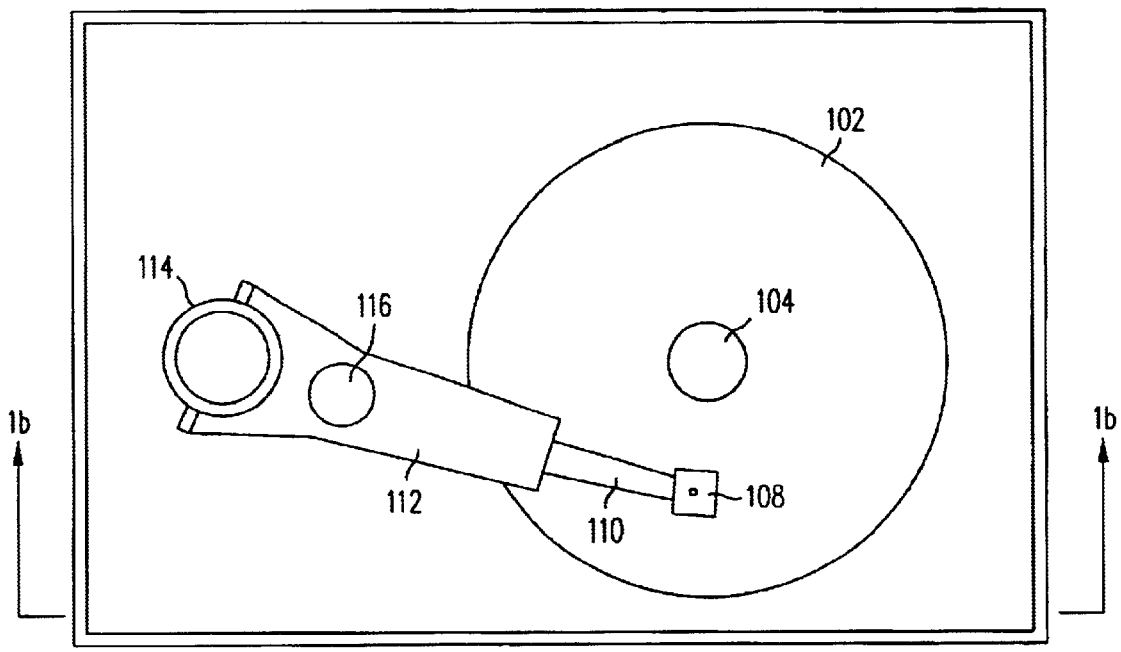
FIG. 1a illustrates a top view of a disk drive.
Figure 1B:
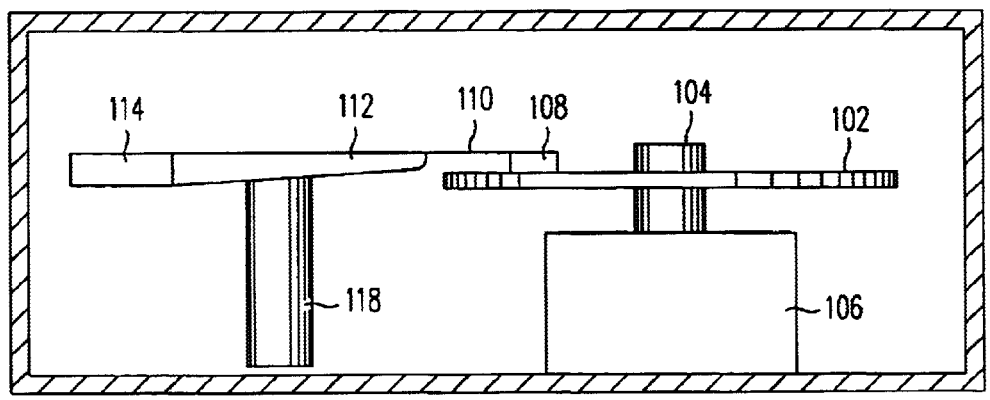
FIG. 1b illustrates a side view of the disk drive.

With reference to FIGS. 1a and 1b, an embodiment of the present invention is shown comprising a disk drive 100 as illustrated. The disk drive includes at least one magnetic recording disk 102. The disk 102 is mounted on a spindle 104 which is connected to a motor 106. During the operation of the disk drive 100, the motor 106 spins the spindle 106 thereby rotating the disk 102. A slider 108 which has an attached recording head is connected to a suspension 110. The suspension 110 is attached to an arm 112. The arm 112 has a coil 114 mounted on a distal end from the suspension 110. During normal operation the actuator assembly which includes the slider 108, the suspension 110, the arm 112, and the coil 114 rotates about a pivot point 116 defined by the location of an actuator post 118.

FIG. 2a illustrates an embodiment of a disk 200 according to the invention. The layers illustrated in FIG. 2a may suitably be formed by known vacuum deposition methods. The substrate 202 is typically formed from glass or an alloy of predominately aluminum. Aluminum substrates typically are suitably electroplated with an amorphous NiP layer. Substrates of a ceramic material or silicon are also suitable. A preseed layer 204 of amorphous CrTiY is formed directly on the substrate. The preseed layer 204 is described in more detail below. A seed layer 206, suitably of RuAl, is formed over the preseed layer 204. The underlayer 208, typically a chromium alloy such as CrTi, CrMo, or CrW, is formed over the seed layer 206. An optional magnetic onset layer 210 of a cobalt alloy such as CoCr, CoPtCr and CoPtCrTa may be formed over the underlayer 208 for further refinements in the properties of the magnetic layer 212. The magnetic layer 212 is formed over the onset layer 210 if present or directly over the underlayer 208. The material in the optional onset layer 210 is selected in part to match the lattice parameters of the underlayer 208 with the lattice parameter of the magnetic layer 212. Lattice parameters of the onset layer 210 which are intermediate between that of the underlayer 208 and that of the magnetic layer 212 may strengthen the epitaxy growth in the desired direction. The magnetic layer 212 is commonly formed from an alloy of cobalt such as CoPtCrTa or CoPtCrB. The layers between the substrate 202 and the magnetic layer 212 promote the epitaxial growth of the ($11\bar{2}0$) crystallographic structure in the cobalt alloy of the magnetic layer 212. The degree to which the ($11\bar{2}0$) structure exists in the magnetic layer 212 determines the extent of the desired inplane orientation within the magnetic layer 212. Finally a protective overcoat 214, typically containing carbon, is formed over the magnetic layer 212.

An alternate embodiment of a disk 201, according to the invention, is illustrated in FIG. 2b. As shown in FIG. 2b the magnetic layer (212 in FIG. 2a) is replaced by an antiferromagnetically coupled (AFC) sandwich of layers. The optional onset layer (210 in FIG. 2a) may also be used with an AFC structure. Suitable AFC structures are disclosed in U.S. Pat. No. 6,280,813 issued Aug. 20, 2001, the disclosure of which is incorporated herein by reference. The AFC structure has a first ferromagnetic layer 216 commonly called the AFC1 layer, a nonmagnetic layer 218 usually of Ru, and a second ferromagnetic layer 220, called the AFC2 layer. A typical composition of the AFC1 layer 216 is CoCr. A typical composition of the AFC2 layer 220 is a cobalt alloy such as CoPtCrTa or CoPtCrB. The crystallographic structure of ($11\bar{2}0$) is also desired for the AFC1 216 and AFC2 220 layers. The other layers, including the substrate 202, the preseed layer 204, the seed layer 206, the underlayer 208, the optional onset layer 208, and the overcoat 214 of the disk in FIG. 2b are similar to the layers of the disk illustrated in FIG. 2a.

The primary role of the seed layer is to control the orientation, grain size, and grain size distribution of the magnetic grains in the magnetic layer. The grain size and orientation achieved in the seed layer is propagated into the magnetic layer through epitaxial growth of the subsequent layers including the magnetic layer. Embodiments of the preseed layer provided by the invention enhances the effectiveness of the seed layer to improve the above mentioned parameters of the magnetic layer.

As used herein the seed layer is defined as the layer closest to the substrate which has a crystalline structure. Referring to FIG. 2a, the preseed layer 204 of CrTiY sandwiched between the seed layer 206 and the substrate 202 has an amorphous structure which is not crystalline. Again referring to FIG. 2a, the presence of a preseed layer 204 of CrTiY is found to be particularly effective in positively influencing the properties of the magnetic layer 212. It is believed that the positive benefit of the preseed layer results from modifying the short range interatomic distances and interactions which influence the nucleation of the RuAl seed layer. The properties of the resulting RuAl seed layer then influence the properties of the underlayer and magnetic layer. Preseed layer compositions of CrTiZr and CrTiB were also evaluated for effectiveness as a preseed layer, however CrTiY was found to have the most beneficial effect. The range of compositions which were found to be most suitable have the chromium content roughly equal to the titanium content (by atomic percent) and a yttrium content ranging from about 1% to about 20%, preferably from about 1% to about 10%. For example, Cr(45%)Ti(45%)Y(10%) and Cr(47.5%)Ti(47.5%)Y(5%) are suitable compositions. A suitable thickness of the preseed layer is between about 10 nm and about 50 nm.

In order to test the effectiveness of a preseed layer containing CrTiY, four disk samples were fabricated which had identical constructions except the composition of the preseed layer. The composition and test results of the four disk samples are shown in the table presented in FIG. 3. Each disk sample had a glass substrate, a seed layer of RuAl, an underlayer of Cr(90%)Ti(10%), an AFC magnetic structure, and a carbon overcoat. One indication of performance of the magnetic layer is the degree to which the magnetic orientation lies within the plane of the magnetic layer. A measure of the amount of inplane orientation is obtained from a rocking curve of the X-ray intensity of the cobalt ($11\bar{2}0$) constituent vs. tilt angle. Lower values of the full width half maximum (FWHM) of the peak intensity vs. tilt angle indicates better inplane orientation. The FWHM data in FIG. 3 for both the (200) peak of RuAl and the ($11\bar{2}0$) peak of the Co layer indicate that the presence of the amorphous preseed layer of CrTiY significantly improves the inplane orientation. The data given in FIG. 3 also show that the addition of Y to the CrTi preseed layer results in up to 0.4 dB improvement in signal to noise ratio and about 1% improvement in the readback pulse width, PW50.

From the forgoing, it will be apparent that a disk with the preseed layer provided by the invention offers substantially improved magnetic performance. This is evidenced by the improved inplane orientation, the improved signal to noise, and the improved readback pulse width of the disks having the preseed layer. Although a specific embodiment of the invention has been described and illustrated, the invention is not to be limited to the specific forms or arrangements of parts thus described. The invention is limited only by the claims.

We claim:

1. A disk for magnetic recording, comprising:
   a substrate;
   a preseed layer formed over said substrate, wherein said preseed layer is comprised of Cr, Ti, and Y;
   a seed layer formed over said preseed layer; and,
   a magnetic layer formed over said seed layer.

2. A disk as in claim 1, wherein the amount of Y in the preseed layer is less than about 20% and greater than about 1%.

3. A disk as in claim 1, wherein the disk further comprises an underlayer of chromium alloy formed over said seed layer.

4. A disk as in claim 1, wherein the substrate is formed from glass.

5. A disk as in claim 1, wherein the substrate is formed from an alloy of aluminum.

6. A disk as in claim 1, wherein the preseed layer has a thickness between about 10 nm and 50 nm.

7. A disk drive, comprising:
   a disk, having
      a substrate,
      a preseed layer formed over said substrate, wherein said preseed layer is comprised of Cr, Ti, and Y, a seed layer formed over said preseed layer, and a magnetic layer formed over said seed layer; and, a recording head for recording digital information on said disk.

8. A disk drive as in claim 7, wherein the amount of Y in the preseed layer is less than about 20% and greater than about 1%.

9. A disk drive as in claim 7, wherein the substrate is formed from glass.

10. A disk drive as in claim 7, wherein the substrate is formed from an alloy of aluminum.

11. A disk drive as in claim 7, wherein the preseed layer has a thickness between about 10 nm and 50 nm.

12. A disk drive as in claim 7, wherein the disk further comprises an underlayer of chromium alloy formed over said seed layer.

\* \* \* \* \*

UNITED STATES PATENT AND TRADEMARK OFFICE
Certificate

Patent No. 6,677,052 B2                                                           Patented: January 13, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Xiaoping Bian, San Jose, CA(US); Mary Frances Doerner, Santa Cruz, CA (US); Kai Tang, San Jose, CA (US); Qi-Fan Xiao, San Jose, CA (US); and Adam Polcyn, Pittsburgh, PA (US).

Signed and Sealed this Twentieth day of April 2010.

<div style="text-align:right">

JENNIFER MCNEIL
*Supervisory Patent Examiner*
Art Unit 1794

</div>